United States Patent [19]

Propst et al.

[11] 4,255,611

[45] Mar. 10, 1981

[54] ENERGY DISTRIBUTION SYSTEM FOR ENCLOSED AREAS

[75] Inventors: Robert L. Propst, Ann Arbor; Michael A. Wodka, Ypsilanti, both of Mich.

[73] Assignee: Herman Miller, Inc., Zeeland, Mich.

[21] Appl. No.: 953,096

[22] Filed: Oct. 20, 1978

[51] Int. Cl.³ .............................................. H02G 3/28
[52] U.S. Cl. ....................................... 174/48; 52/221
[58] Field of Search ...................... 174/48, 49; 52/220, 52/221; 339/22 R, 23

[56] References Cited

U.S. PATENT DOCUMENTS

| 1,611,325 | 12/1926 | Tashjian | 174/49 |
|---|---|---|---|
| 2,039,982 | 5/1936 | Schaller | 174/48 |
| 2,043,776 | 6/1936 | Schaller | 174/49 X |
| 2,277,794 | 3/1942 | Small | 174/49 X |
| 3,377,756 | 4/1968 | Polhamus | 174/48 X |
| 3,676,974 | 7/1972 | Daly | 174/48 X |
| 3,708,607 | 1/1973 | Brode et al. | 174/48 |
| 3,984,621 | 10/1976 | Propst | 174/48 |
| 4,017,137 | 4/1977 | Parks | 174/48 X |
| 4,043,626 | 8/1977 | Propst et al. | 339/23 |

Primary Examiner—B. A. Reynolds
Assistant Examiner—D. A. Tone
Attorney, Agent, or Firm—Olsen and Stephenson

[57] ABSTRACT

An energy distribution system comprising elongated support members housing power and communication lines and being arranged end to end on a floor along the primary walls of an enclosed area such as a room in an office building. Each support member includes an upright wall member to which a pair of vertically-spaced upper and lower support portions are mounted in a cantilevered arrangement to extend horizontally in one direction from the upright wall member. The support portions define a pair of utility spaces, an upper utility space being provided between the support portions and a lower utility space being provided below the lower support portion wherein the utility spaces house the electrical and communication lines. A secondary wall panel is positioned on the support members to cover and conceal the primary walls. Cover strips are detachably mounted on the support members to cover the utility spaces so as to provide the support members with the appearance of a continuous extension of the secondary wall panels.

6 Claims, 5 Drawing Figures

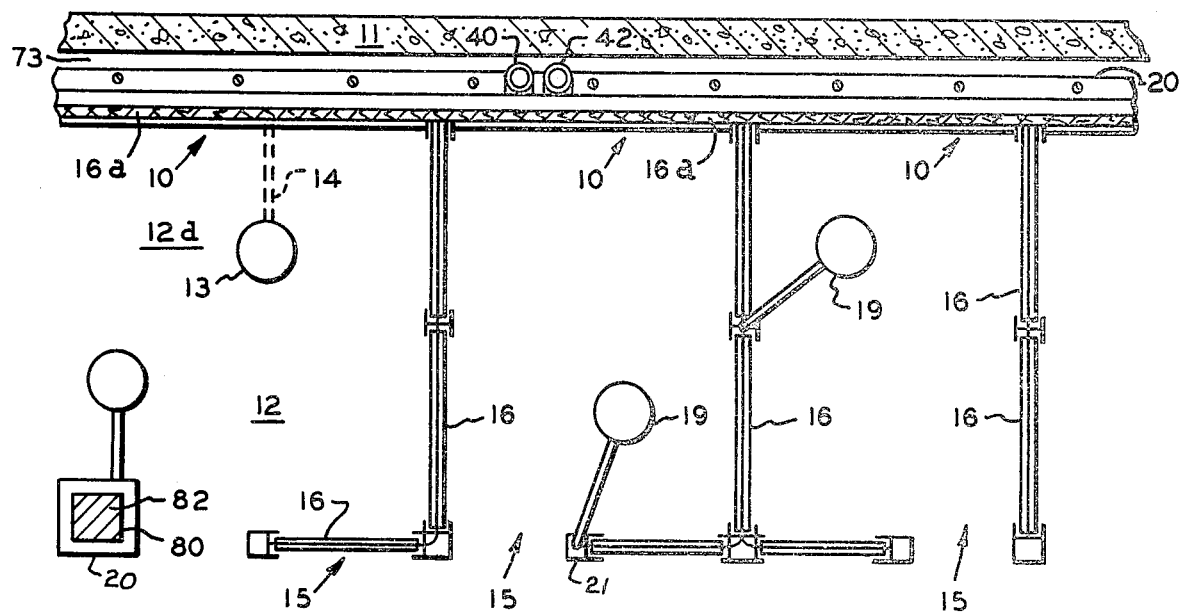
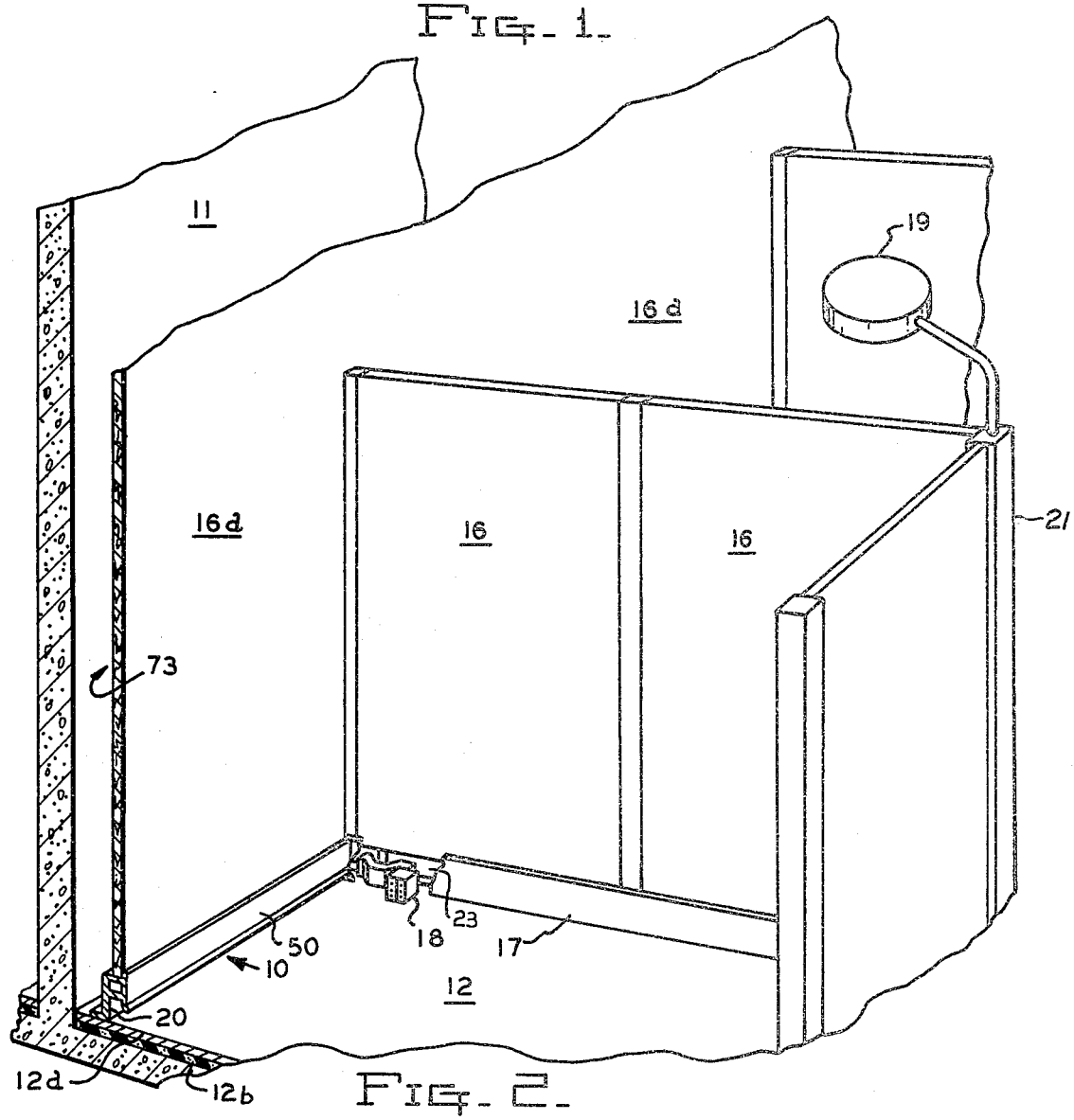

ENERGY DISTRIBUTION SYSTEM FOR ENCLOSED AREAS

BACKGROUND OF THE INVENTION

The present invention relates generally to modular offices, and more particularly, to a system for supplying the various offices or work areas of the modular office system with electrical power and communication service.

Modular office systems are an increasingly popular alternative to permanent offices in office buildings for the important reason that these modular systems enable the tenant to arrange offices or work stations to meet his particular needs. The popularity of modular office arrangements can be further attributed to the fact that increased emphasis is being placed on user comfort and privacy as well as office decor and style which creates an atmosphere conducive to productive work.

Maximum flexibility in arranging the various offices and work stations of a modular office system is essential if the benefits of a modular office are to be achieved. However, in the past there has been an inability to supply efficiently each individual office setting with electrical power and communication service. This has been the primary factor that limited the flexibility of the modular office system. This energy distribution problem has been addressed, however, in U.S. Pat. No. 4,043,626, and in a related pending application Ser. No. 825,655, filed Aug. 18, 1977, both of which are assigned to the assignee of the present application. In the above patent and related application, support sections for movable wall partitions are disclosed which house power and communication lines to which telephone stations and various electrically-operated equipment can be connected. The support sections are equipped at each end with a connector for connecting the cables of adjacent support sections. Service outlets installed on the support sections at various locations receive plugs or cords from various electrical devices enabling their operation within the work stations or offices.

In U.S. Pat. No. 3,984,621, also assigned to the assignee of the present application, a laminated floor construction is disclosed on which work stations and modular offices are positioned. Grooves are formed in a sub-covering to receive transmission cables for conveying power from a wall outlet, for example, to the particular work station or office or for extending a cable to a free standing light fixture, for example, which is positioned away from the walls. The grooves have a depth substantially equal to the height of the cable in order to maintain a smooth and substantially continuous top surface on which a top floor covering such as carpeting is placed.

Normally, electrical and telephone lines are permanently installed within the floors, walls, and ceilings of a building. Significant savings would be realized, however, if these lines were mounted on the surfaces of the walls so as to be easily movable to various locations to accommodate the needs of the user. The use of secondary wall panels and a portable energy distribution system could then be implemented to conceal the exposed lines and distribute the energy to desired locations along the walls of the building.

It is the general object of the present invention, therefore, to provide an energy distribution system for conveying electrical power and communication service along the walls within a building structure.

It is another object of the present invention to provide an energy distribution system which readily interfaces the electrical and telephone systems installed in the building with interior energy distribution systems for the modular office settings.

In accordance with the present invention, an energy distribution system is disclosed for conveying electrical power and providing communication service along the base of the primary walls of an enclosed area and can be interfaced with the energy distribution system of U.S. Pat. No. 4,043,626 and pending application Ser. No. 825,655, filed Aug. 18, 1977, and U.S. Pat. No. 3,984,621. The energy distribution system of this invention consists of a plurality of elongated support members arranged end to end along the primary walls of an enclosed area such as a room. Each support member consists of an upright wall member to which a pair of vertically spaced-apart upper and lower support portions are mounted in a cantilevered arrangement to extend horizontally from the wall member in one direction. Wall panels are located on the support members to conceal the primary walls which can be unfinished and on which electrical cables or the like are mounted. The support portions define a pair of utility spaces, a top or upper utility space being provided between the support portions and a lower utility space being provided below the lower support portion. The exposed side ends of the support portions are vertically spaced apart to define an access opening to the upper utility space. The utility spaces serve to house electrical and telephone lines and the support members are supplied with various services outlets connected to these lines to which telephones and electrically-operated devices located within the various office settings can be connected.

A cover strip is detachably mounted on each support member and engages upright flanges formed on the horizontal support portions at their free-hanging ends. The cover member provides the support members with an appearance being an extension of the panels which are supported on the top support portions of the support members. The cover strip is easily removed to permit access to the utility spaces for purposes of servicing or installing additional lines.

The support members are positioned along side the primary walls of the room and are suitably secured to the floor or to the wall at desired locations on the support member, openings are formed through which the electrical and telephone lines that are affixed to the primary walls are extended into the utility spaces. The horizontal support portions of the support members support panel partitions spaced somewhat from the primary walls providing a clearance between the primary walls and the support panels to conceal the exposed electrical and telephone lines which are mounted on the surfaces of the primary walls.

An elongated outlet structure connected to the power lines is detachably mounted on the support member below the lower support portion in the bottom utility space. Suitable outlets are provided on the outlet structure to permit the connection of various electrically operated devices to the power supply. The cover member is constructed so that when it is mounted on the support member, a clearance is provided between the floor on which the support member is positioned and the cover member. This clearance provides an adequate space through which extension cords and the like can extend for connection to the power and telephone lines in support members.

Further objects, features, and advantages of the present invention will become apparent from a consideration of the following description when taken in connection with the appended claims and the following drawing in which:

FIG. 1 is a plan view of a modular office arrangement having various electrical devices connected to an electrical system in a building structure by means of the energy distribution system of the present invention;

FIG. 2 is a perspective view of a portion of the modular office arrangement illustrated in FIG. 1 and showing one support member of the energy distribution system of the present invention;

Figure 3:
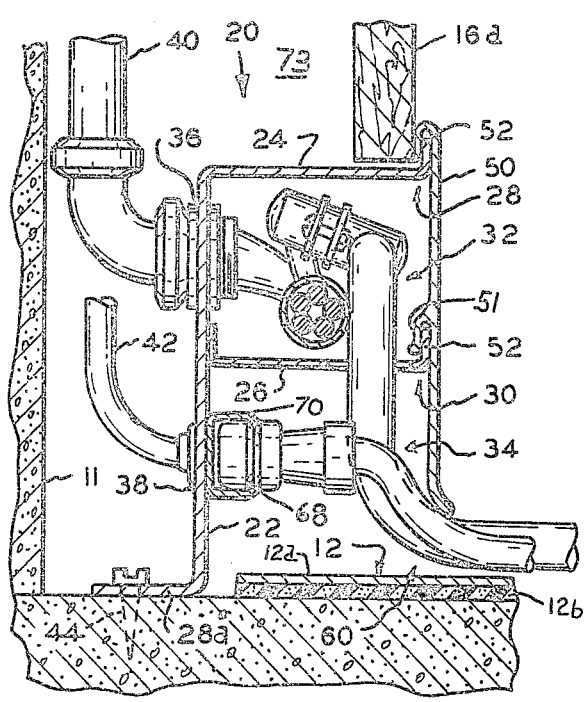
FIG. 3 is a cross sectional view of a support member of the energy distribution system of the present invention showing electrical and communication transmission lines disposed therein.

With reference to the drawing, the energy distribution system, indicated generally at 10 in FIG. 1, functions to convey electrical power and provide communication service along the perimeter of a room in a building structure having a primary wall 11 and a floor construction 12. The floor 12 can be of a laminate construction as disclosed in U.S. Pat. No. 3,984,621 wherein a sub-covering 12b is positioned on the floor and has a a plurality of grooves in its top surface into which cables or the like can be disposed so as to maintain a smooth top surface. A top covering such as carpeting 12a completes the laminate construction to cover the cables disposed in the sub-covering 12b. A free standing light fixture 13 can thus be positioned away from the walls of the room with its cord 14 extending to the energy system 10 beneath the carpeting 12a.

The room is divided into a plurality of modular offices 15 formed by movable wall panels 16 that are arranged end to end to form the desired offices 15. The wall panels 16 are disposed on support sections 17 such as those disclosed in U.S. Pat. No. 4,043,626 and pending application Ser. No. 825,655, filed Aug. 18, 1977. The support sections 17 house electrical cables which have connectors 18 at each end for interconnecting adjacent support sections 17. As shown in FIGS. 1 and 2, the support sections 17 are connected to the energy distribution system 10 which is disposed in juxtaposition with the wall 11 and the floor 12 for transmitting electrical power through the offices 15.

Light fixtures 19 in FIGS. 1 and 2 are shown mounted on the wall partitions 16 and conduits (not shown) formed in panel connectors 21 enable wires to connect the light fixtures 19 to power lines in the support sections 17. Spaces, one shown at 23, below the wall partitions 16 serve, for example, to house telephone lines.

The energy distribution system 10 comprises elongated support members 20 that are mounted on the building structure in juxtaposition to the primary wall 11 and the floor construction 12. As shown in FIG. 2, the support members 20 are positioned on the laminate floor construction 12 which extends to the wall 11. As shown in FIG. 3, the support members 20 are mounted directly on the supporting floor, as the laminate floor construction 12 terminates beneath the support members 20 at a selected location short of the wall 11. Each support member 20 includes an upright wall member 22, top and bottom support portions 24 and 26, and a mounting plate 28a. The top support portion 24 is located at the upper edge or portion of the upright wall 22 and extends horizontally therefrom towards the interior of the room or office 15. The bottom support portion 26 is located below the top support portion 24 and above the floor 12 and also extends horizontally away from the upright wall member 22 towards the interior of the room. The top and bottom support portions 24 and 26 are mounted on the upright wall member 22 in a cantilevered arrangement in which only one of their ends is anchored to the upright wall member 22. The outer ends 28 and 30 of the support portions 24 and 26 are unanchored and are vertically spaced apart with each other to define an access opening between the support portions 24 and 26.

The top and bottom support portions 24 and 26 define one top utility space 32 therebetween and a second lower or bottom utility space 34 is provided below the lower support portion 26 extending to the floor 12. The utility spaces 32 and 34 house electrical and telephone lines that are extended along the base of the primary walls 11. As shown in FIG. 3, inlet openings 36 and 38 are formed in the upright wall 22 through which the telephone conduit 40 and the electrical conduit 42 extend into the utility spaces 32 and 34. The mounting plate 28a extends in a substantially horizontal direction that is opposite to horizontal direction in which the top support portion 24 and bottom support portion 26 extends. The support members 20 are secured to the floor 12 by suitable fasteners such as the screws 44 of which only one is shown in FIG. 3. The mounting plate 28a can also be located directly below the support portions 24 and 26 (not shown). In other words, the mounting plate 28a extends from the wall 22 in the same direction as do the support portions 24 and 26 providing the support member 20 with a generally C-shaped construction.

A cover strip 50 is detachably mounted on the support member 20 and coacting means is provided to hang the cover strip 50 on upright flange portions 52 formed at the free ends 28 and 30 of the top and bottom support portions 24 and 26. The cover strip 50 is provided with vertically spaced-apart inverted hook portions 51 on its inner surface to engage the flanges 52 so as to enable the easy installation and removal of the cover strip 50 by lowering and raising it from the flanges 52. The cover strip 50 has a height such that when it is mounted on the support member 20, a clearance 60 is provided between its bottom edge and the carpeting 12a. As seen in FIG. 3, the telephone and electrical wires extend through the clearances from the utility space 34 above the carpeting 12a. If desired, these lines can be disposed in the laminate floor construction 12 in a manner that is disclosed in U.S. Pat. No. 3,984,621 and illustrated in FIG. 4 and described in greater detail below. This clearance 60 permits electrical cords and telephone lines to extend between the telephones and electrically-powered equipment and the lines housed in the utility spaces 32 and 34.

Figure 5:
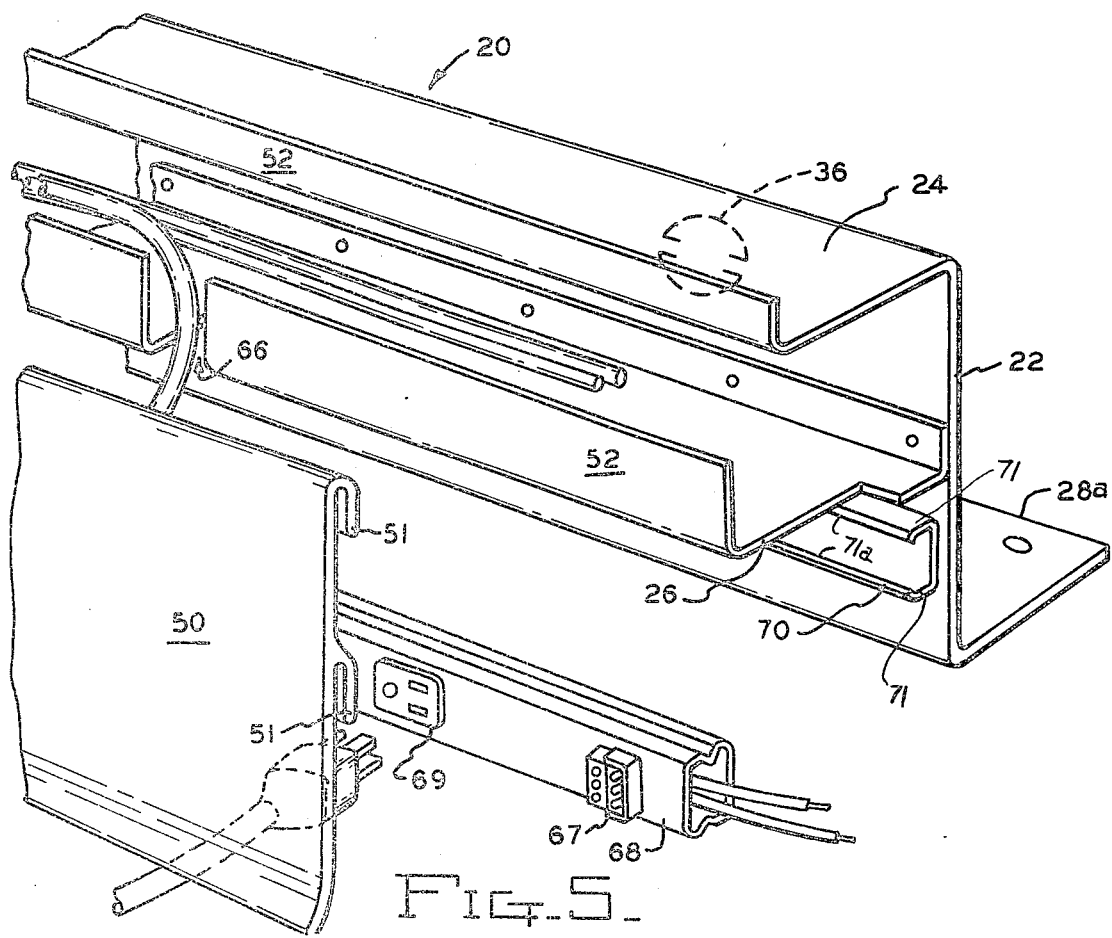
FIG. 5 is an exploded perspective view of a support member of the energy distribution system.

Passageway means in the form of access slots 66 (one shown in FIG. 5) are formed through the bottom support portion 26 effecting communication between the utility spaces 32 and 34. As seen in FIG. 3, the telephone line 40 extends downwardly from the utility space 32 through the access opening 66 and exits the support member 32 through the clearance 60.

An elongated service outlet structure 68 is mounted on the inside surface of the wall 22 and consists of a hollow conduit member housing electrical wires connected to special connector receptacles 67 (one shown) and conventional connector receptacles 69 (one shown). Commom light fixtures and electrical equipment positioned in the modular offices 15 are connected to the building's electrical system through the conventional receptacles 69.

The special connector receptacles 67 are constructed to receive the connectors 18 on the support sections 17, such as the connectors disclosed in copending application Ser. No. 825,655, filed Aug. 18, 1977. Accordingly, the energy distribution system 10 interfaces the energy supply system arranged in the room with the building's electrical and communication system. Provision of the standard receptacles 69 and the special receptacles 67 along the perimeter of the rooms enables greater flexibility in erecting modular office arrangements to fit a desired floor plan, along with the optimum placement of the lighting and electrical equipment.

Figure 4:
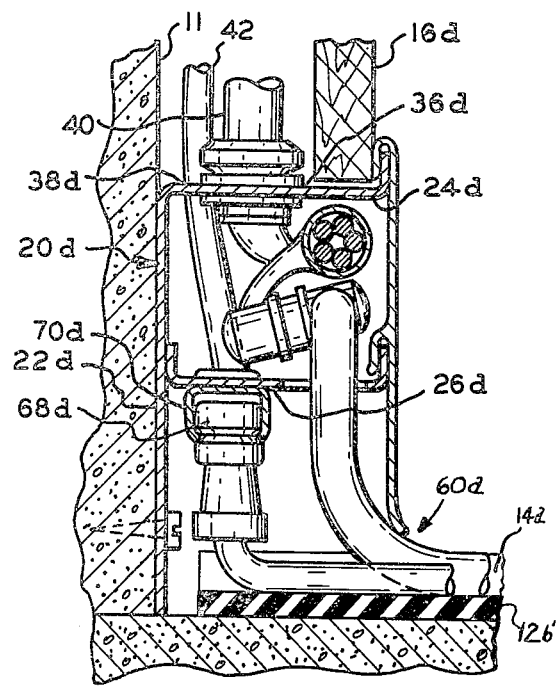
FIG. 4 is a cross sectional view of a modified form of the support member shown in FIG. 3.

A C-shaped holder 70 disposed on the wall 22 and having parallel legs 71 terminating at inwardly canted edges 71a releasably supports the outlet structure 68 in the lower utility space 34. The parallel legs 71 straddle the outlet structure 68 with the canted edges 71a disposed in grooves on opposite sides of the structure 68 to hold it in a position in which the outlet receptacles 67 and 69 face in a generally horizontal direction as shown in FIG. 3. As seen in FIG. 4, the outlet structure can be mounted so that the regular and special outlet receptacles face downwardly as will be described in greater detail below.

The support member 20, illustrated in FIG. 3, is spaced a suitable distance from the wall 11 which at a minimum is equivalent to the width of the plate 28a to accommodate the lines that are mounted on the wall 11. Thus, a clearance 73 is provided between the wall 11 and the wall partitions 16a that are mounted on the support members 20. In the instance where the mounting plate 28a extends from the wall 22 in the same direction as the supports 24 and 26 the clearance 73 is determined by the selective positioning of the support member 20 with respect to the wall 11.

In a modified form of the present invention, as shown in FIG. 4, a support member 20a is provided having an upright wall member 22a mounted directly on the primary wall 11 as no mounting plate 28a is provided. Access openings 36a and 38a are formed through the top support portion 24a through which the telephone lines and power lines extend to the upper and lower utility spaces in the support member 20a. In the embodiment shown in FIG. 4, a service outlet structure 68a and its associated holder 70a are mounted on the under side of the bottom support portion 26a. In all other respects, however, the construction of the support member 20a corresponds to the construction of the support member 20. In this embodiment, the telephone and electrical lines extend from the support member 20a through the clearance 60a so as to be disposed in the grooves (one shown at 14a) in the subcovering 12b of the laminate floor construction. A top covering such as carpeting (not shown) is laid on the subcovering 12b to conceal the telephone and power lines. This is in contrast to the arrangement illustrated in FIG. 3 wherein the lines extend from the support member 20 to rest on the carpeting 12a.

The energy distribution system 10 is easily installed by arranging the support members 20 or 20a in an end-to-end arrangement adjacent to the primary walls 11. Panel partitions 16a are positioned on the upper portions 24 and are spaced from the primary walls 11 so as to be clear of the power and telephone lines thereby effecting the clearance or base opening 73 between the partitions 16a and the wall 11. The panel partitions 16a thus overlie the primary walls 11 concealing the exposed wires on the surface of the walls 11.

The energy distribution system 10 has been shown to be positioned on the floor or floor construction 12 adjacent to the primary walls 11 of a room. This, however, is not the only arrangement in which the system 10 can be employed. The support members 20 can be located near any wall-type construction. For example, in FIG. 1, support members 20 are shown arranged on the floor construction 12 in juxtaposition to the walls 80 of a pillar 82 to surround the pillar 82. A light fixture, for instance, can be connected to the electrical lines housed in the support members 20. Suitable panels can be placed on the support members 20 for covering and concealing the walls 80 thereby providing the room with a harmonious appearance. Consequently, the energy distribution system 10 can easily be adapted to various environments.

From the above description, it can be seen that an improved energy distribution system 10 is provided which enables the ready distribution of electrical power and communication service to the various office settings 15. The system 10 can be easily disassembled and installed in other enclosed areas thereby saving the tenant time and money.

What is claimed:

1. An energy distribution system comprising an elongated support member adapted to be positioned on a supporting surface, said elongated support member comprising an upright wall member having top and bottom portions, said bottom portion of said upright wall member terminating at a bottom edge a top support portion on said support member connected at one end thereof to said wall member and extending away therefrom in a general horizontal direction, a bottom support portion positioned between said top support portion and the bottom support portion of said upright wall member, said bottom support portion being connected only at one end thereof to said wall member in a cantilevered arrangement, said bottom support portion extending away from said upright wall member in said general horizontal direction so as to form a pair of utility spaces, one of said utility spaces being provided between said support portions and the other utility space being provided below said bottom support portion, means for maintaining said wall member in an upright position on said supporting surface, passageway means formed through said bottom support portion enabling communication between said utility spaces whereby elements that are positionable in one of said utility spaces can be extended through said passageway means into the other of said utility spaces, the ends of said support portions projecting outward from said wall member being vertically spaced apart to define an access opening communicating with one of said utility spaces, an upright flange extension on said top support portion, an upright flange extension on said bottom support portion, and a cover member with a pair of vertically spaced apart inverted hook portions, said hook portions engaging said flange extensions so that said cover member is removably mounted by hanging on said support portions and thereby covers said access opening to one utility space and extends downwardly below said bottom support portion to a position spaced above said bottom edge thereby forming a clearance below said cover member when said support member is positioned on a supporting surface.

2. The energy distribution system according to claim 1 further including electrical transmission means mounted on said support member in said other utility space, said transmission means including an elongated hollow carrier in which electrical conductors or the like are disposed, a holder member mounted on said support member for removably supporting said carrier member in said second utility space, and outlet means on said carrier member providing for the connection of electrically-operated devices to said electrical conductors.

3. The energy distribution system according to claim 2 wherein said holder member comprises a U-shaped construction having substantially parallel legs straddling said carrier member so as to maintain it on said support member.

4. The energy distribution system according to claim 1 further including inlet openings formed in said support member communicating with at least one of said utility spaces.

5. An energy distribution system in combination with a building structure having primary walls and a supporting surface, said energy distribution system comprising a plurality of support members arranged end to end on said supporting surface adjacent to at least one of the primary walls, each of said support members having an upright wall member and having means defining a first utility space comprising vertically spaced-apart support portions connected to and extending in one direction away from said upright wall member, a second utility space located below the lower one of said support portions and extending to the supporting surface, said support members being disposed adjacent to said one primary wall in positions in which said upright wall members are between said primary wall and said utility spaces, means defining an access opening between said support portions communicating with said first utility space, a cover member removably mounted on said support portions to cover said access opening, said cover member extending downwardly from said upper one of said support portions to a position spaced from said supporting surface to form a base opening along the lower edge of said cover member, energy transmission means disposed in said utility spaces and extensible through said base opening for connection with a device positioned in spaced relationship with said primary walls, and passageway means formed through the lower one of said support portions enabling said transmission means to be disposed in one of said utility spaces and extended through said passageway means into the other of said utility spaces.

6. The energy distribution system according to claim 5 further including secondary wall structure mounted in an upright position on said upper one of said support portions at a position spaced from said primary wall structure thereby providing a clearance in which power transmission means or the like can be disposed.

* * * * *